(12) United States Patent
Matsumae

(10) Patent No.: US 10,943,108 B2
(45) Date of Patent: Mar. 9, 2021

(54) IMAGE READER PERFORMING CHARACTER CORRECTION

(71) Applicant: KYOCERA Document Solutions Inc., Osaka (JP)

(72) Inventor: Keisaku Matsumae, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 91 days.

(21) Appl. No.: 16/520,883

(22) Filed: Jul. 24, 2019

(65) Prior Publication Data

US 2020/0042786 A1 Feb. 6, 2020

(30) Foreign Application Priority Data

Jul. 31, 2018 (JP) .............................. JP2018-144368

(51) Int. Cl.
*G06K 9/00* (2006.01)
*H04N 1/00* (2006.01)
(Continued)

(52) U.S. Cl.
CPC ......... *G06K 9/00469* (2013.01); *G06K 9/342* (2013.01); *G06K 9/6215* (2013.01);
(Continued)

(58) Field of Classification Search
CPC .. G06K 9/00469; G06K 9/6215; G06K 9/342; G06K 2209/01; G06K 9/033; G06K 9/723; H04N 1/00331; H04N 1/2038
(Continued)

(56) References Cited

U.S. PATENT DOCUMENTS 7,869,653 B2* 1/2011 Shizuka .................. G06K 9/03
382/182
2001/0043740 A1* 11/2001 Ichikawa ............... G06K 9/726
382/176
(Continued)

FOREIGN PATENT DOCUMENTS

JP 2006-339770 A 12/2006
JP 2013-250725 A 12/2013

*Primary Examiner* — Jerome Grant, II
(74) *Attorney, Agent, or Firm* — IP Business Solutions, LLC

(57) ABSTRACT

An image reader includes a document reading unit, and a control unit that functions as an individual image cutting section, character string detection section, mismatch detection section, judgment section, and correction section. The individual image cutting section cuts out individual images from image data obtained through reading by the document reading unit. The character string detection section detects character strings present on the individual images. The mismatch detection section detects, for the character strings detected by the character string detection section, a mismatching portion by making comparison between the individual images with considering character strings having contents identical or similar to each other as same information. The judgment section judges for the mismatching portions whether a ratio of majority characters reaches a predefined ratio. Upon judging that the ratio of the majority characters has reached the predefined ratio, the correction section replaces a minority character with the majority character.

7 Claims, 13 Drawing Sheets

(51) Int. Cl.
  *G06K 9/62*     (2006.01)
  *G06K 9/34*     (2006.01)
  *H04N 1/203*    (2006.01)

(52) U.S. Cl.
  CPC ....... *H04N 1/00331* (2013.01); *H04N 1/2038* (2013.01); *G06K 2209/01* (2013.01)

(58) Field of Classification Search
  USPC .......................................................... 382/176
  See application file for complete search history.

(56)                References Cited

U.S. PATENT DOCUMENTS

| | | | |
|---|---|---|---|
| 2002/0169763 A1* | 11/2002 | Tada ................... | G06F 16/3338 |
| 2006/0183092 A1* | 8/2006 | Kogo ..................... | G09B 13/04 |
| | | | 434/227 |
| 2015/0009542 A1* | 1/2015 | Zhao .................. | G06K 9/00469 |
| | | | 358/462 |
| 2018/0144121 A1* | 5/2018 | Jenkinson ............. | G06F 21/645 |
| 2018/0285677 A1* | 10/2018 | Wada ................... | G06K 9/6814 |
| 2019/0019049 A1* | 1/2019 | Takakura ............. | G06K 9/2027 |
| 2019/0294912 A1* | 9/2019 | Takabayashi ........ | G06K 9/4604 |
| 2020/0320328 A1* | 10/2020 | Kasahara ............. | G06K 9/3233 |

\* cited by examiner

Fig.4
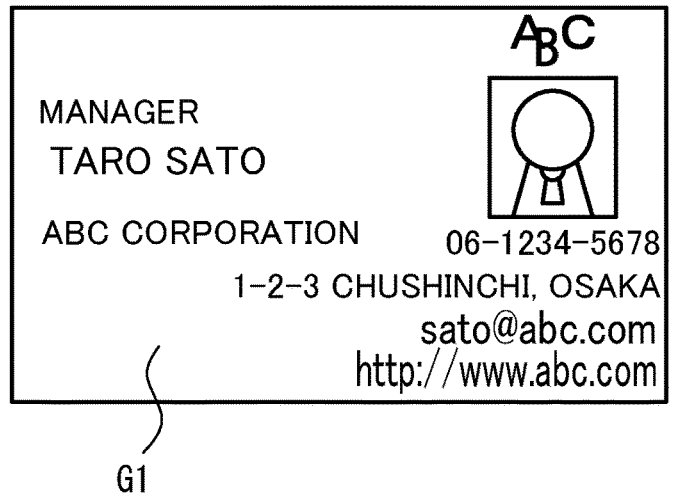
G1
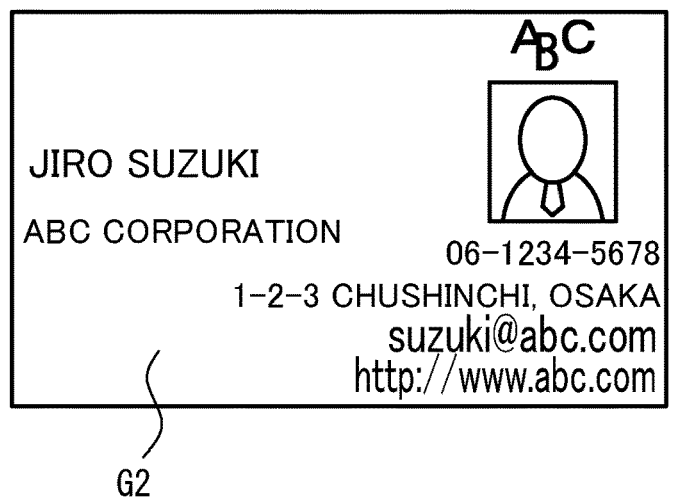
G2
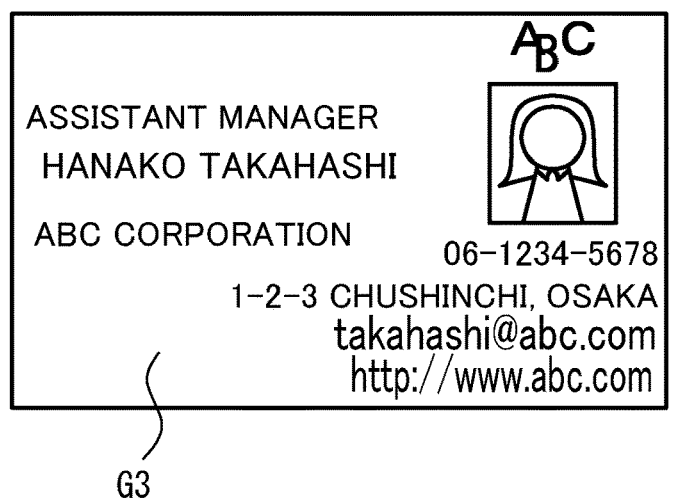
G3

Fig.5

LIST OF CHARACTER STRINGS DETECTED FROM
INDIVIDUAL IMAGE G1

| |
|---|
| MANAGER |
| TARO SATO |
| ABC CORPORATION |
| 06－1234－5678 |
| 1-2-8 CHUSHINCHI, OSAKA |
| sato@abc. com |
| http://www. abc. com |

LIST OF CHARACTER STRINGS DETECTED FROM
INDIVIDUAL IMAGE G2

| |
|---|
| JIRO SUZUKI |
| ABC CORPORATION |
| 06－1234－5678 |
| 1-2-9 CHUSHINCHI, OSAKA |
| suzuki@abc. com |
| http:11www. abc. com |

LIST OF CHARACTER STRINGS DETECTED FROM
INDIVIDUAL IMAGE G3

| |
|---|
| ASSISTANT MANAGER |
| HANAKO TAKAHASHI |
| ABC CORPORATION |
| 06－1234－S678 |
| 1-2-3 CHUSHINCHI, OSAKA |
| takahashi@abc. com |
| http://www. abc. co |

Fig.9

|  | INDIVIDUAL IMAGE G1 | INDIVIDUAL IMAGE G2 | INDIVIDUAL IMAGE G3 |
|---|---|---|---|
| GROUP 1 | ABC CORPORATION | ABC CORPORATION | ABC CORPORATION |
| GROUP 2 | 06-1234-5678 | 06-1234-5678 | 06-1234-5678 |
| GROUP 3 | 1-2-8 CHUSHINCHI, OSAKA | 1-2-9 CHUSHINCHI, OSAKA | 1-2-3 CHUSHINCHI, OSAKA |
| GROUP 4 | @abc.com | @abc.com | @abc.com |
| GROUP 5 | http://www.abc.com | http:11www.abc.com | http://www.abc.co |

LT1

Fig.13
G11
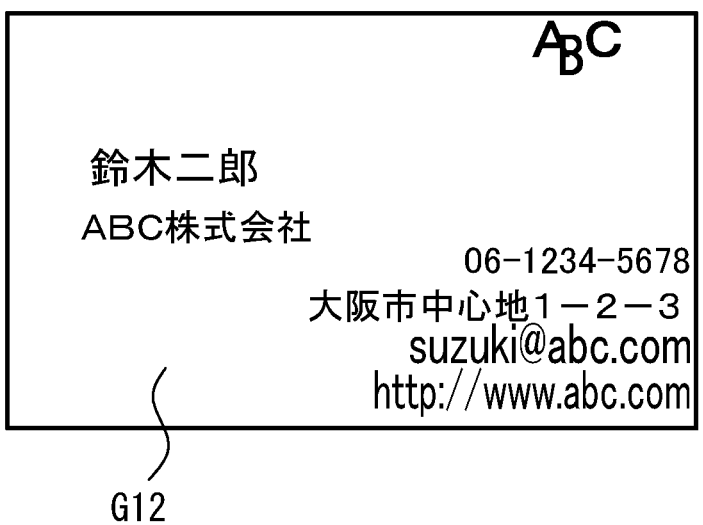
G12

IMAGE READER PERFORMING CHARACTER CORRECTION

INCORPORATION BY REFERENCE

This application claims priority to Japanese Patent Application No. 2018-144368 filed on 31 Jul. 2018, the entire contents of which are incorporated by reference herein.

BACKGROUND

This disclosure relates to an image reader and more specifically to a technology of correcting a character string analyzed from images obtained by reading a plurality of documents.

Some image readers have a function (so-called multi-crop function) of collectively reading a plurality of documents loaded on a document loading surface (for example, contact glass) and automatically cutting out the documents as individual images independent for the respective documents.

There is a technology of using such a function to cause an image reader to read a plurality of name cards loaded on a document loading surface and manage the name cards. There is also a technology of causing an image reader to first read one surface of a name card, read the other surface of the name card which has been flipped over by a user and manage a front surface and a rear surface of the name card in combination.

SUMMARY

A technology obtained by further improving the aforementioned technologies will be suggested as one aspect of this disclosure.

An image reader according to one aspect of this disclosure includes a document reading unit and a control unit. The document reading unit is capable of, through one reading job, collectively reading a plurality of documents loaded on a document loading surface. The control unit includes a processor and functions as, when the processor executes a control program, an individual image cutting section, a character string detection section, a mismatch detection section, a judgment section, and a correction section. The individual image cutting section performs processing of cutting out, from image data obtained through the reading by the document reading unit, individual images independent for the respective documents. The character string detection section performs character recognition processing on the image data of the individual images cut out by the individual image cutting section to detect character strings present on the individual images. The mismatch detection section detects, from the character strings detected by the character string detection section, a mismatching portion by making comparison between the individual images with considering character strings having contents identical or similar to each other as same information. The judgment section judges for the mismatching portions whether or not a ratio of majority characters included in the same information reaches a predefined ratio. The correction section, upon judging by the judgment section that the ratio of the majority characters has reached the predefined ratio, performs character correction by replacing a minority character with the majority character within the same information.

BRIEF DESCRIPTION OF THE DRAWINGS

FIG. 4 is a diagram illustrating one example of individual images cut out by an individual image cutting section.

FIG. 5 is a diagram illustrating one example of character strings detected by a character string detection section.

FIG. 9 is a diagram illustrating one example of a character string list.

FIG. 13 is a diagram illustrating one example of individual images cut out by an individual image cutting section.

DETAILED DESCRIPTION

Figure 1:
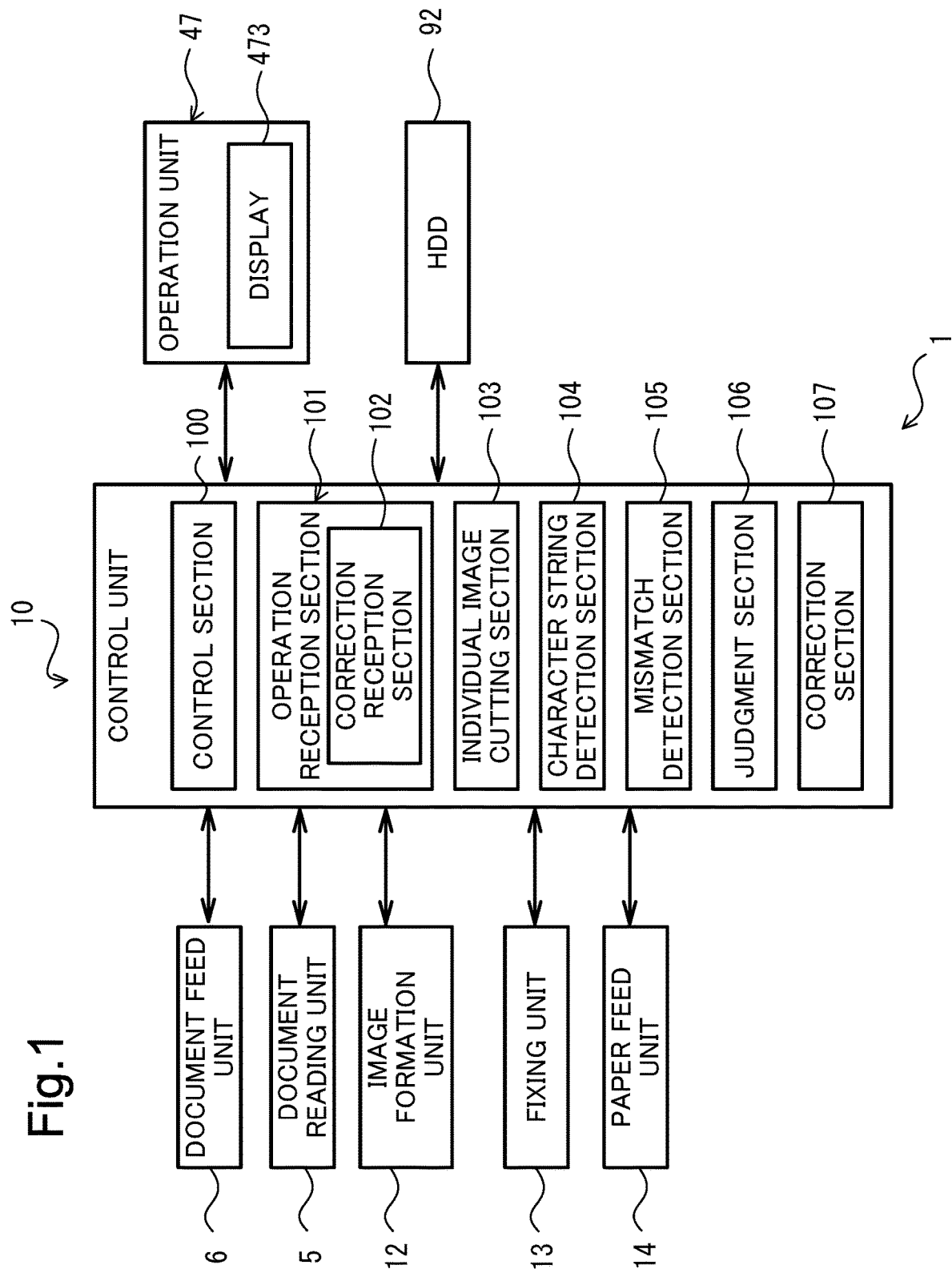
FIG. 1 is a functional block diagram schematically illustrating main inner configuration of an image forming apparatus including an image reader according to a first embodiment of this disclosure.
Figure 2:
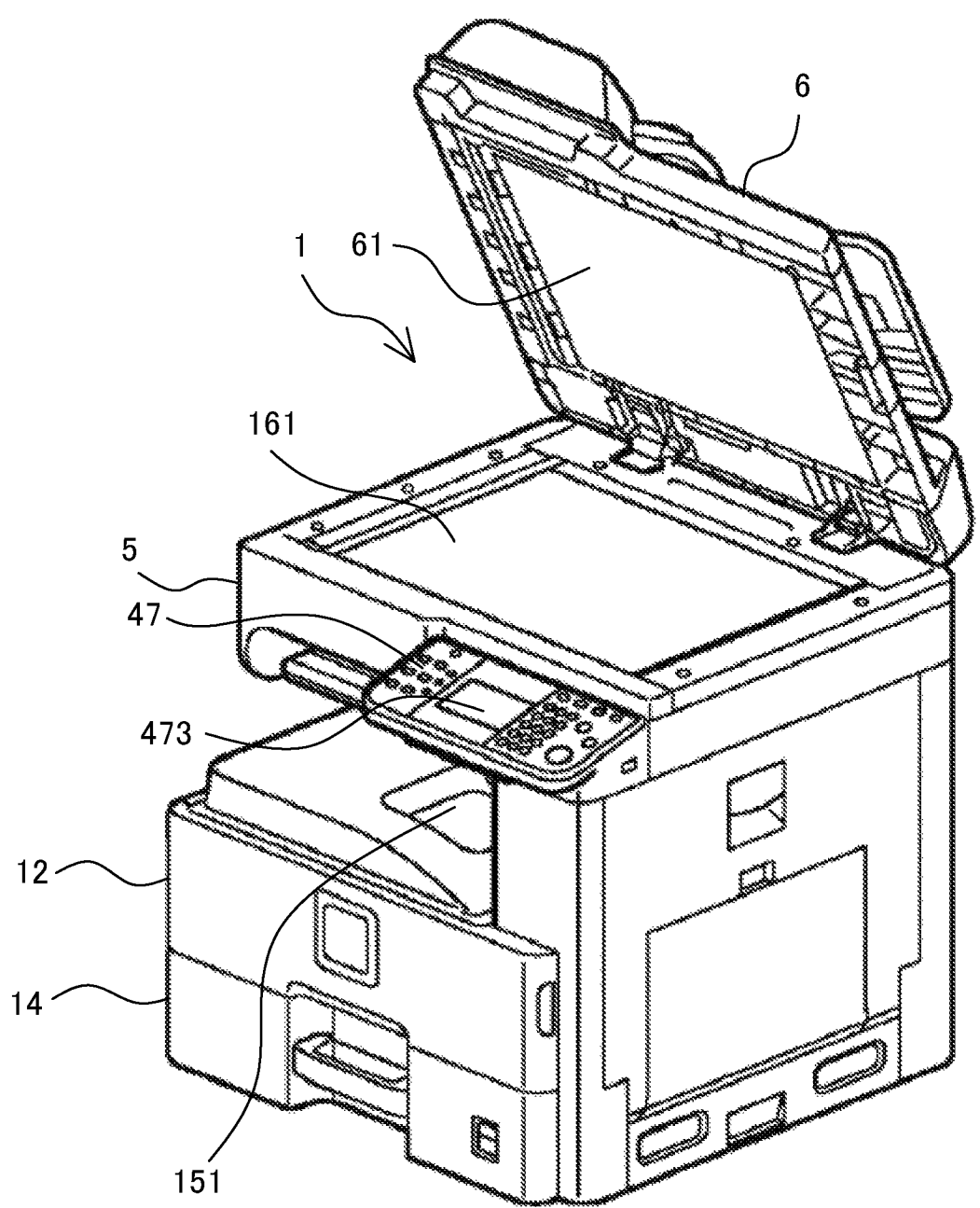
FIG. 2 is a perspective view illustrating outer appearance of the image forming apparatus including the image reader according to the first embodiment.

Hereinafter, an image reader according to one embodiment of this disclosure will be described with reference to the drawings. FIG. 1 is a functional block diagram schematically illustrating main inner configuration of an image forming apparatus including an image reader according to a first embodiment of this disclosure. FIG. 2 is a perspective view illustrating outer appearance of the image forming apparatus including the image reader according to the first embodiment.

The image forming apparatus 1 is a multifunction peripheral combining together a plurality of functions such as, for example, a copy function, a printer function, a scanner function, and a facsimile function. The image forming apparatus 1 includes: a control unit 10, a document feed unit 6, a document reading unit 5, an image formation unit 12, a fixing unit 13, a paper feed unit 14, and an operation unit 47.

A case where document reading operation is performed in the image forming apparatus 1 will be described. The document reading unit 5 optically reads an image of a document conveyed by the document feed unit 6 or a document loaded on contact glass 161 and then generates image data. The image data generated by the document reading unit 5 is saved into, for example, an image memory. The document reading unit 5 is also capable of collectively reading a plurality of documents loaded on the contact glass 161. Note that the contact glass 161 is one example of a document loading surface in the scope of the claims.

The document feed unit 6 is formed on a top surface of the document reading unit 5 with, for example, a hinge in an openable and closable manner. The document feed unit 6 includes a document mat 61. The document mat 61 functions as a document press cover upon reading of the document loaded on the contact glass 161.

A case where image formation operation is performed in the image forming apparatus 1 will be described. Based on, for example, the image data generated through the document reading operation or image data received from a computer serving as an external device connected to a network, the image formation unit 12 forms a toner image on recording paper as a recording medium fed from the paper feed unit 14.

The fixing unit 13 fixes the toner image on the recording paper through thermal compression, and the recording paper subjected to fixing processing is discharged onto a discharge tray 151. The paper feed unit 14 includes a paper feed cassette.

The operation unit 47 receives, from an operator, instructions, such as an image formation operation execution instruction, for various types of operation and processing executable by the image forming apparatus 1. The operation unit 47 includes a display 473 which displays, for example, an operation guide to the operator. The display 473 includes, for example, a liquid crystal display. The display 473 includes a touch panel, and the operator can touch a button or a key displayed on a screen to operate the image forming apparatus 1.

The control unit 10 includes: a processor, a random access memory (RAM), a read only memory (ROM), and a dedicated hardware circuit. The processor is, for example, a central processing unit (CPU), an application specific integrated circuit (ASIC), or a micro processing unit (MPU). The control unit 10 includes: a control section 100, an operation reception section 101, an individual image cutting section 103, a character string detection section 104, a mismatch detection section 105, a judgment section 106, and a correction section 107.

As a result of performing operation in accordance with a control program stored in a hard disk drive (HDD) 92 as a storage unit by the aforementioned processor, the control unit 10 functions as the control section 100, the operation reception section 101, the individual image cutting section 103, the character string detection section 104, the mismatch detection section 105, the judgment section 106, and the correction section 107. Note that, however, the control section 100, etc. can each be formed by a hardware circuit without depending on the operation performed in accordance with the control program by the control unit 10. Unless otherwise is specified, the same applies to each of embodiments below.

The control section 100 is in charge of overall operation control of the image forming apparatus 1. The control section 100 is connected to the document feed unit 6, the document reading unit 5, the image formation unit 12, the fixing unit 13, the paper feed unit 14, and the operation unit 47 and performs, for example, driving control of the aforementioned sections.

The operation reception section 101 receives an operation input from a user through the operation unit 47. The operation reception section 101 also includes a correction reception section 102. Details of the correction reception section 102 will be described later on.

The individual image cutting section 103 performs processing of cutting out individual images independent for the respective documents from the image data obtained through the reading by the document reading unit 5. For example, the individual image cutting section 103 executes edge detection processing on the image data obtained through the reading by the document reading unit 5 to detect an edge image.

Then the individual image cutting section 103 performs processing of cutting out, as the aforementioned individual images, rectangular images with four sides surrounded by the edge image as one image from the image data which has been obtained through the reading by the document reading unit 5 and in which the edge image has been detected.

Figure 3:
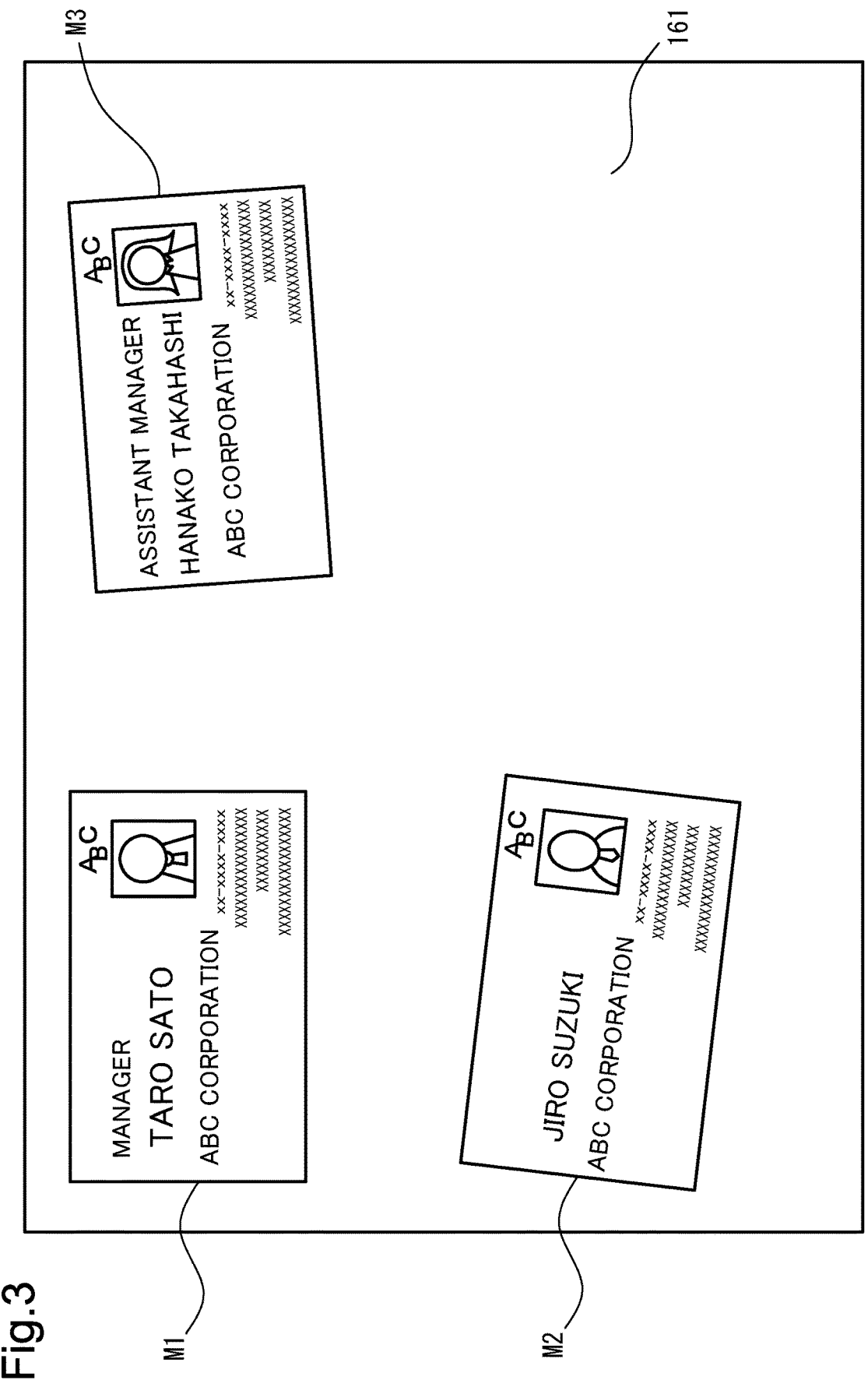
FIG. 3 is a diagram illustrating one example of a state in which documents are loaded on contact glass, viewed from a bottom.

FIG. 3 is a diagram illustrating one example of a state in which a plurality of documents is loaded on the contact glass 161, viewed from a bottom. Some characters in FIG. 3 should have been same in the respective parts in FIG. 4. Because of the size of some parts of FIG. 3 being relatively smaller, the characters would have become too small and been unable to comply with the rules. For this reason, the letter "X" is used in FIG. 3 to replace the characters. As illustrated in FIG. 3, when a plurality of documents M1 to M3 (for example, name cards) are loaded on the contact glass 161 and read by the document reading unit 5, based on image data obtained through the reading, rectangular images corresponding to the documents M1 to M3 are cut out as individual images G1 to G3 (see FIG. 4) by the individual image cutting section 103.

FIG. 4 is a diagram illustrating one example of the individual images cut by the individual image cutting section 103. The individual images G1 to G3 include, for example, official positions (may not be included), names, company names, company logos, face photos, phone numbers, addresses, mail addresses, and home page addresses.

The character string detection section 104 performs, by use of, for example, an optical character recognition (OCR) technology, character recognition processing on the image data of the individual images cut out by the individual image cutting section 103 to detect character strings present on the individual images.

For example, the character string detection section 104 detects, from the individual image G1 (FIG. 4), character strings "Manager", "Taro Sato", "ABC Corporation", "06-1234-5678", "1-2-3 Chushinchi, Osaka", "sato@abc.com", and "http://www.abc.com".

Moreover, the character string detection section 104 detects, from the individual image G2 (FIG. 4), character strings "Jiro Suzuki", "ABC Corporation", "06-1234-5678", "1-2-3 Chushinchi, Osaka", "suzuki@abc.com", and "http://www.abc.com", and detects, from the individual image G3 (FIG. 4), character strings "Assistant Manager", "Hanako Takahashi", "ABC Corporation", "06-1234-5678", "1-2-3 Chushinchi, Osaka", "takahashi@abc.com", and "http://www.abc.com".

However, the character string detection section 104 can not necessarily detect all the character strings present on the individual images G1 to G3 with accuracy without any mistakes. FIG. 5 is a diagram illustrating one example of the character strings detected by the character string detection section 104. Note that portions not correctly recognized are emphasized by broken lines.

FIG. 5 proves that the character string detection section 104 erroneously recognizes "8" for "3" in the address present on the individual image G1, "9" for "3" in the address present on the individual image G2, "11" for "//" in the home page address present on the individual image G2, and "S" for "5" in the phone number present on the individual image G3, and cannot recognize a final "m" in the home page address present on the individual image G3.

The mismatch detection section 105 detects, for the character strings detected by the character string detection section 104, mismatching portions by making comparison between the individual images with considering the character strings having contents identical or similar to each other as the same information. For example, the mismatch detection section 105 treats, as the same information, those with a match rate of characters forming the character strings which is equal to or greater than a predefined value (for example, 70%).

For example, the match rate of the characters forming the character strings "ABC Corporation" detected from the individual images G1 to G3 is 100%, and thus the mismatch detection section 105 treats them as the same information. Moreover, the match rate of the characters forming the character strings "06-1234-5678" detected from the individual images G1 and G2 and the characters forming the character string "06-1234-S678" detected from the individual image G3 is 90%, and thus the mismatch detection section 105 treats them as the same information.

Similarly, the mismatch detection section 105 treats the character string "1-2-8 Chushinchi, Osaka" detected from the individual image G1, the character string "1-2-9 Chushinchi, Osaka" detected from the individual image G2, and the character string "1-2-3 Chushinchi, Osaka" detected from the individual image G3 as same information, treats the character strings "@abc.com" detected from the individual images G1 to G3 as same information, and treats the character string "http://www.abc.com" detected from the individual image G1, the character string "httpp:11www.abc.com" detected from the individual image G2, and the character string "http://www.abc.co" detected from the individual image G3 as same information.

Then the mismatch detection section 105 compares, for example, the character strings "06-1234-5678" detected from the individual images G1 and G2 with the character string "06-1234-S678" detected from the individual image G3 to detect the ninth characters ("5" in the individual images G1 and G2 and "S" in the individual image G3) as mismatching portions.

Moreover, the mismatch detection section 105 compares, for example, the character string "1-2-8 Chushinchi, Osaka" detected from the individual image G1, the character string "1-2-9 Chushinchi, Osaka" detected from the individual image G2, and the character string "1-2-3 Chushinchi, Osaka" detected from the individual image G3 with each other to detect the eleventh characters ("8" in the individual image G1, "9" in the individual image G2, and "3" in the individual image G3) as mismatching portions.

Note that the first embodiment has been described, referring to the case where the mismatch detection section 105 treats the character strings, which have been detected by the character string detection section 104 and which have identical or similar contents, as the same information. However, as another embodiment, the character string detection section 104 may detect the character strings present on the individual images and may also detect positions of the character strings on the individual images, and the mismatch detection section 105 may detect the positions of the character strings on the individual images and may treat, as same information, the character strings which are located at the identical or close positions on the individual images and also have the contents identical or similar to each other. Consequently, those which are arranged at largely separated places can be excluded from a comparison target.

For example, listed as a method for determining whether or not the positions are close to each other is a method for comparing smallest rectangular regions surrounding the respective character strings with each other, judging whether or not at least a given amount of overlapping occurs at positions of the rectangular regions in the respective individual images, and determining by the mismatch detection section 105 that the positions are close to each other if at least the given amount of overlapping has occurred.

Moreover, listed as a method for specifying the smallest rectangular regions surrounding the character strings is a method for extracting smallest and largest X coordinates and smallest and largest Y coordinates where a horizontal side of the individual image passing through a left upper corner of the aforementioned individual image is an X-axis and a vertical side passing through the left upper corner is a Y-axis and all positions of the characters forming the character string detected from the aforementioned individual image are indicated as coordinates, and then specifying the aforementioned rectangular region from four sides with the aforementioned four points serving as vertexes.

The judgement section 106 judges, for the mismatching portions detected by the mismatch detection section 105, whether or not a ratio of the majority characters in the aforementioned same information reaches a predefined ratio TH1 (described here referring to an example where TH1 is over a half of the total ratio). For example, when the ninth character in the phone number is recognized as "5" in the individual images G1 and G2 and as "S" in the individual image G3 as described above, the judgment section 106 judges that the ratio (67%) of the majority characters "5" has reached over the half.

Upon judging by the judgment section 106 that the ratio of the majority characters has reached the predefined ratio TH1, the correction section 107 performs character correction by replacing the minority character in the aforementioned same information with the majority character. For example, the character recognized as "S" in the individual image G3 is replaced with the majority character "5".

Moreover, for example, when the eleventh character in the address is recognized as "8" in the individual image G1, as "9" in the individual image G2, and as "3" in the individual image G3 as described above, the judgment section 106 judges that a ratio (33%) of the majority character (same ratios of "8", "9", and "3" are provided and all of the three are treated as the majority) has not reached over the half.

Figure 6:
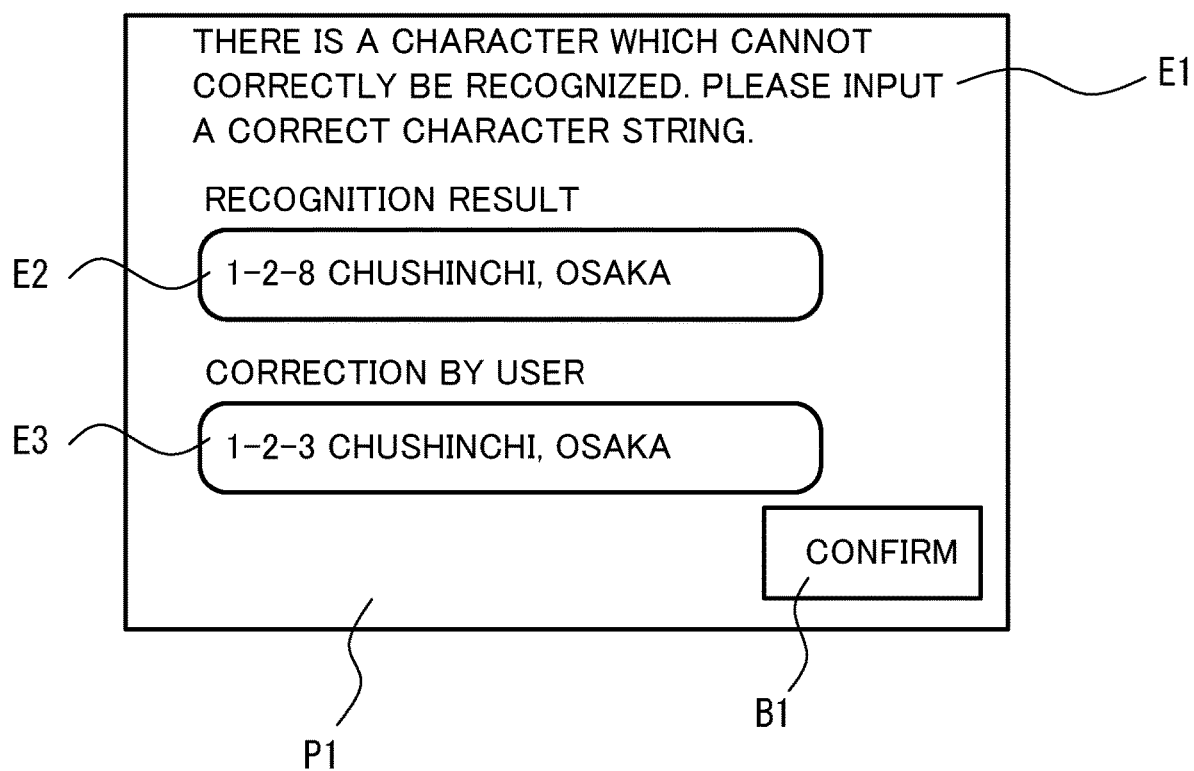
FIG. 6 is a diagram illustrating one example of an operation screen displayed at a display.

Upon judging by the judgment section 106 that the ratio of the majority characters has not reached the predefined ratio TH1, the correction reception section 102 forming the operation reception section 101 receives user correction on the minority character. For example, the correction reception section 102 receives the user correction by displaying an operation screen P1 as illustrated in FIG. 6 at the display 473.

Displayed on the operation screen P1 are: a first display region E1 where a message for prompting input of the correct characters is displayed; a second display region E2 where the character string detected by the character string detection section 104 is displayed; a third display region E3 where a character string inputted by the user through the operation unit 47 is displayed; and a setting button B1 on which "Confirm" is written for confirming user's intension for replacement with the inputted character string. The correction reception section 102 displays, on the second display region E2, the character strings including the minority characters (any character strings may be displayed when ratios of majority are identical or the minority cannot be discriminated).

When the character string has been inputted through the operation unit 47 and the setting button B1 has been pressed, the correction reception section 102 receives the aforementioned correction. Then upon receiving the correction by the correction reception section 102, the correction section 107 corrects the minority character with contents received by the correction reception section 102.

Figure 7:
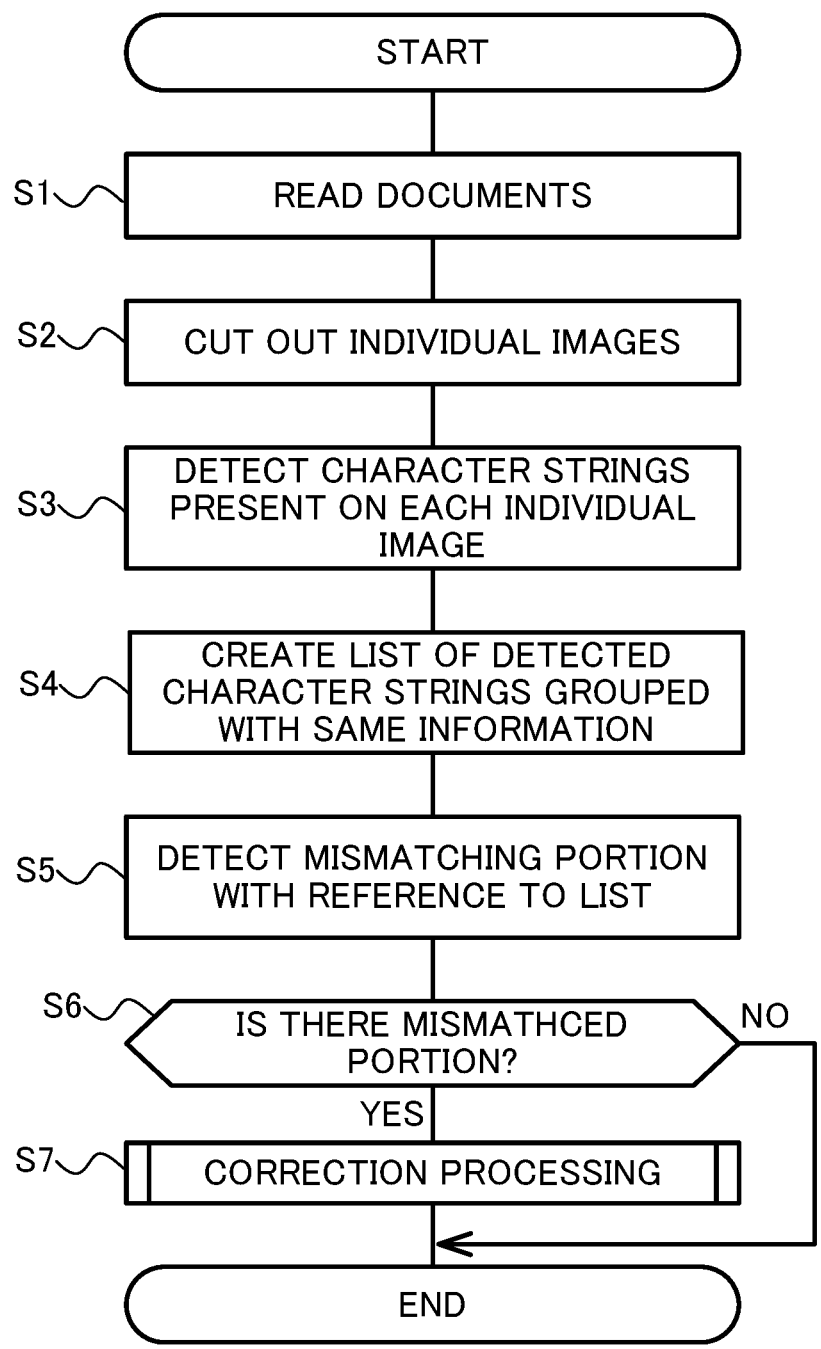
FIG. 7 is a flowchart illustrating one example of processing performed in a control unit of the image forming apparatus as one embodiment of the image reader according to the first embodiment.

Next, one example of processing performed in the control unit 10 of the image forming apparatus 1 as one embodiment of the image reader according to the first embodiment will be described based on flowcharts illustrated in FIGS. 7 and 8. Note that this processing is performed upon receiving, by the operation reception section 101, an instruction for reading the documents loaded on the contact glass 161 which instruction has been instructed from the user through the operation unit 47.

Upon receiving the instruction for reading the documents by the operation reception section 101, the control section 100 controls operation of the document reading unit 5, thereby causing the document reading unit 5 to read the documents loaded on the contact glass 161 (step S1) and causing the image memory to store the documents. Then the individual image cutting section 103 performs processing of cutting out each of the independent individual images from the image data obtained through the reading by the document reading unit 5 (step S2).

Then the character string detection section 104 performs character recognition processing by use of, for example, an OCR technology, on the image data of the individual images cut out by the individual image cutting section 103 to detect the character strings present on the individual images (step S3).

Subsequently, the mismatch detection section 105 creates a character string list LT1 (see FIG. 9) where the character strings in the respective individual images detected by the character string detection section 104 and having same information are provided as one group (step S4).

FIG. 9 is a diagram illustrating one example of the character string list. On the character string list LT1, for the character strings detected from the individual images G1 to G3, the character strings having the same information are respectively grouped. For example, the character string "06-1234-5678" detected from the individual image G1, the character string "06-1234-5678" detected from the individual image G2, and the character string "06-1234-S678" detected from the individual image G3 belong to a group 2.

The mismatch detection section 105 compares the character strings belonging to each group with each other on an individual group basis with reference to the character string list LT1 (FIG. 9) to thereby detect mismatching portions (step S5). The mismatch detection section 105 detects no mismatching portions through comparison between the character strings belonging to the group 1 but detects the ninth characters as the mismatching portions through the comparison between the character strings belonging to the group 2.

The judgment section 106 judges whether or not the mismatch detection section 105 has detected any mismatching portions (step S6). Upon judging by the judgment section 106 that the mismatch detection section 105 has detected any mismatching portions (YES in step S6), it is assumed that there are some errors in the character recognition and the processing proceeds to step S7 where the correction section 107 performs correction processing (see FIG. 8) of correcting the character. On the other hand, upon judging by the judgment section 106 that the mismatch detection section 105 has detected no mismatching portion (NO in step S6), it is assumed that there are no errors in the character recognition and thus the processing ends.

Figure 8:
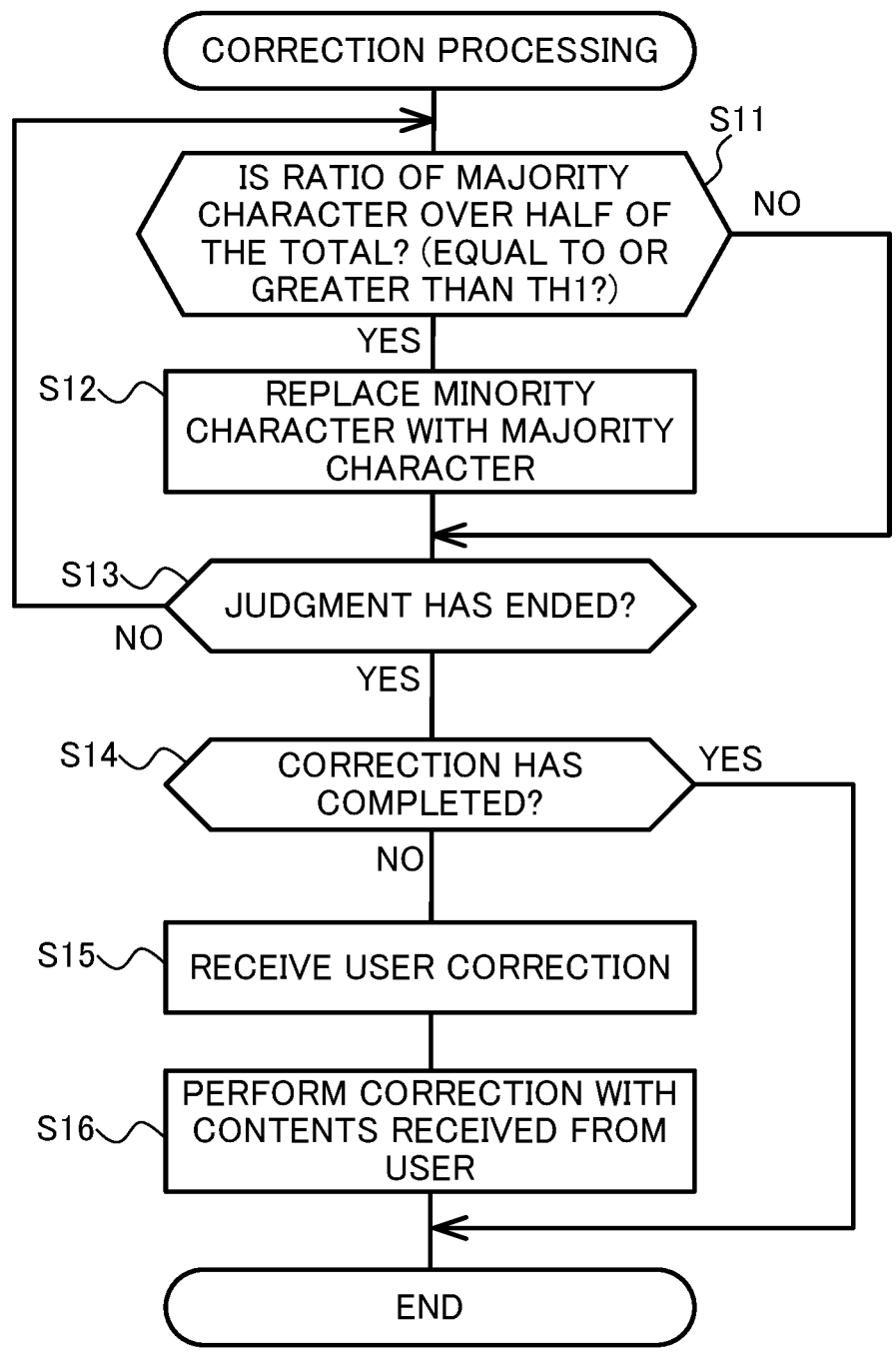
FIG. 8 is a flowchart illustrating one example of processing performed in the control unit of the image forming apparatus as one embodiment of the image reader according to the first embodiment.

In step S11 of FIG. 8, the judgment section 106 judges, for the mismatching portions detected by the mismatch detection section 105 and for each of the groups in which the mismatching portions have been detected, whether or not the ratio of the majority characters has reached the predefined ratio TH1 (for example, over a half of the total ratio) (step S11).

Upon judging by the judgment section 106 that the ratio of the majority characters has reached the predefined ratio TH1 (YES in step S11), the correction section 107 performs character correction by replacing the minority character with the majority character (step S12) and then the processing proceeds to step S13. For example, upon judging by the judgment section 106 that the ratio of the majority characters "5" for the mismatching portions (the ninth characters) in the group 2 (FIG. 9) has reached over the half, the correction section 107 performs correction by replacing the minority character "S", which has been detected from the individual image G3 and which belongs to the group 2, with the majority character "5".

On the other hand, upon judging by the judgment section 106 that the ratio of the majority characters has not reached the predefined ratio TH1 (NO in step S11), the processing proceeds to step S13, skipping step S12. For example, for the mismatching portion (the eleventh character) in the group 3 (FIG. 9), the same ratios of the majority characters ("8", "9", and "3") are present, and thus upon judging by the judgment section 106 that the ratios of all the majority characters have not reached over the half, the correction is not performed here and the processing proceeds to step S13.

The correction section 107 judges, for all the mismatching portions detected by the mismatch detection section 105, whether or not the judgment by the judgment section 106 has ended (step S13). Upon judging that the judgment by the judgment section 106 has ended (YES in step S13), it is judged whether or not the correction section 107 has performed correction for all the mismatching portions detected by the mismatch detection section 105 (step S14). That is, it is judged whether or not the correction section 107 has completed the correction.

More specifically, without judging "NO" even once in S11, when the processing of replacing the minority character with the majority character for all the mismatching portions detected by the mismatch detection section 105 has been executed, the correction section 107 judges that the correction has been completed.

On the other hand, upon judging in step S13 that the judgment by the judgment section 106 has not ended (NO in step S13), the processing returns to step S11.

Upon judging in step S14 that the correction section 107 has not completed the correction (NO in step S14), the correction reception section 102 displays the operation screen P1 as illustrated in FIG. 6 at the display 473 and receives the user correction through the touch panel or the operation unit 47 in accordance with the user operation performed on the operation screen P1 (step S15), and the correction section 107 corrects the minority character with contents received by the correction reception section 102 (step S16). Then the processing ends.

On the other hand, upon judging that the correction section 107 has completed the correction (YES in step S14), the processing ends since processes in steps S15 and S16 are not required. The control section 100 stores, into, for example, the HDD 92, the character string list LT1 corrected by the correction section 107.

Practice of performing OCR processing to recognize the characters and registering name card information as character information into a database to manage the name card information by causing the image reader to read a document such as a name card has conventionally been performed.

Upon this practice, if all the character recognitions through the OCR processing are correctly performed, no problem arises, but if a size of the characters is small, resolution is low, a font which makes it difficult to perform the character recognition is used, or some kind of stain is present on the image, an error may occur in the character recognition, which may require manual correction by the user.

Moreover, technologies of linking together a front surface and a rear surface of a document based on results of OCR processing have conventionally been known, but technologies of resolving an error occurring in character recognition, if any, have not been known.

In contrast, according to the first embodiment, a mistaking portion is detected, for the character strings detected from the individual images, by making comparison between the individual images with considering the character strings having contents identical or similar to each other as the same information. Then, when the ratio of the majority characters reaches the predefined ratio TH1 (for example, over the half of the total ratio), the character correction is performed by replacing the minority character with the majority character.

For example, when the character string "06-1234-5678" is present in two of the three individual images and the character string "06-1234-S678" is present in the remaining one character string (that is, when in the former the ninth character is "5" and in the latter that is "S"), the ratio of the majority characters with respect to the mismatching ninth character is 67%, which is over the half of the total ratio, and thus the minority character "S" is replaced with the majority character "5". Consequently, it is determined that the minority character is a result of character recognition error, whereby the minority character is automatically replaced with the majority character, which permits automatic correction of the character recognition error.

Furthermore, if the ratio of the majority characters has not reached over the half and the automatic correction has not been performed, the user is provided with opportunity to perform manual correction, thus making it possible to appropriately correct those which have erroneously been recognized.

The first embodiment has been described above, referring to the case where the character recognition error is corrected by use of the image data obtained through the reading by the document reading unit 5 through one reading job. A second embodiment will be described, referring to an embodiment in which the character recognition error is corrected by use of all pieces of image data obtained through the reading by the document reading unit 5 through not one but a plurality of reading jobs.

Figure 10:
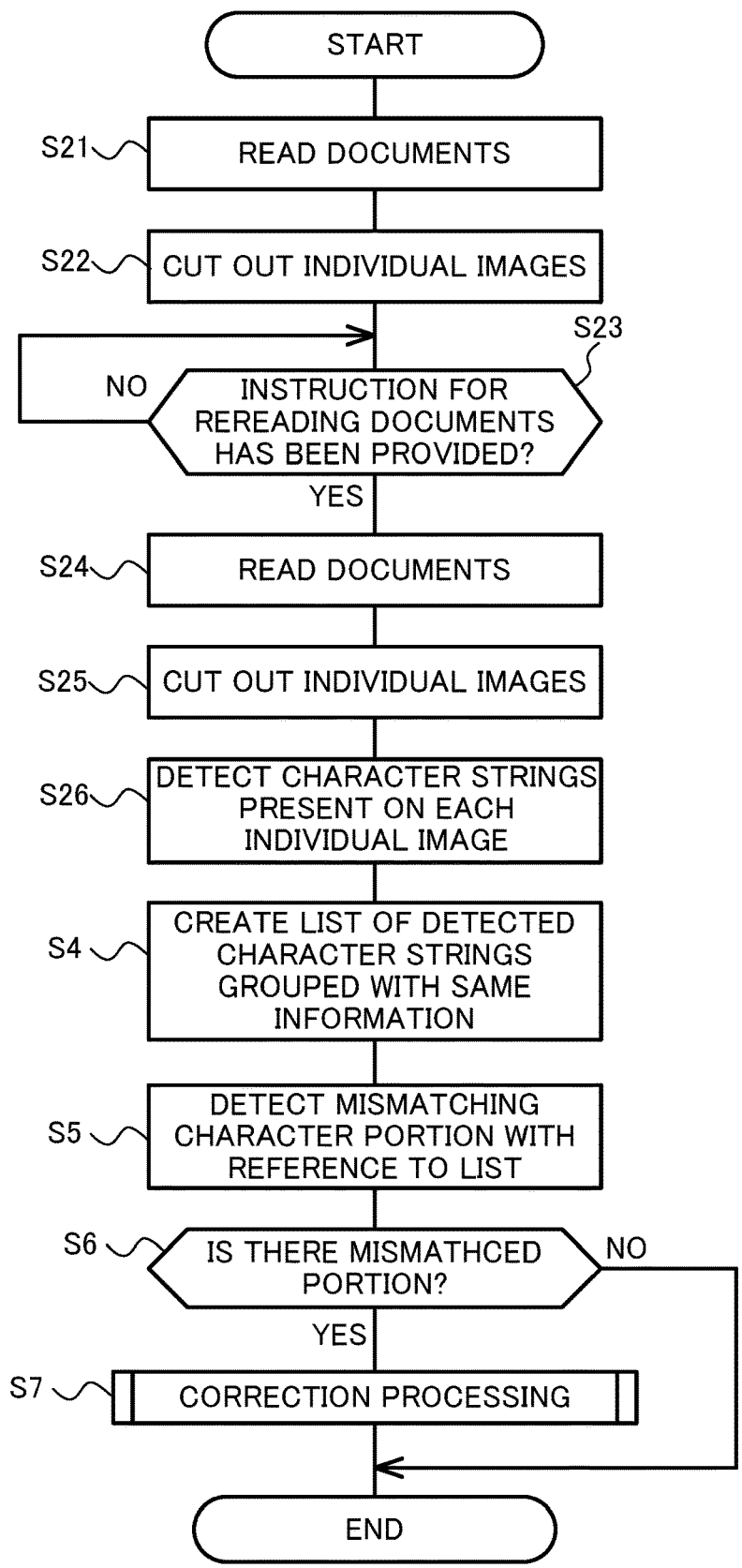
FIG. 10 is a flowchart illustrating one example of processing performed in a control unit of an image forming apparatus as one embodiment of an image reader according to a second embodiment.

Next, one example of processing performed in the control unit 10 of the image forming apparatus 1 as one embodiment of the image reader according to the second embodiment will be described, referring to a flowchart illustrated in FIG. 10. Note that the processing is performed upon receiving, by the operation reception section 101, the instruction for reading both surfaces of documents loaded on the contact glass 161 which instruction has been provided from the user through the operation unit 47.

Upon receiving the instruction for reading the both surfaces of the documents by the operation reception section 101, the control section 100 controls operation of the document reading unit 5, thereby causing the document reading unit 5 to read the documents loaded on the contact glass 161 and causing the image memory to store the aforementioned documents (step S21). Here, it is assumed that image data has been obtained by reading one surface of the documents by the document reading unit 5.

Then an individual image cutting section 103 performs processing of cutting out individual images, which are independent for the respective documents, from the image data obtained through the reading by the document reading unit 5 (step S22).

Figure 11:
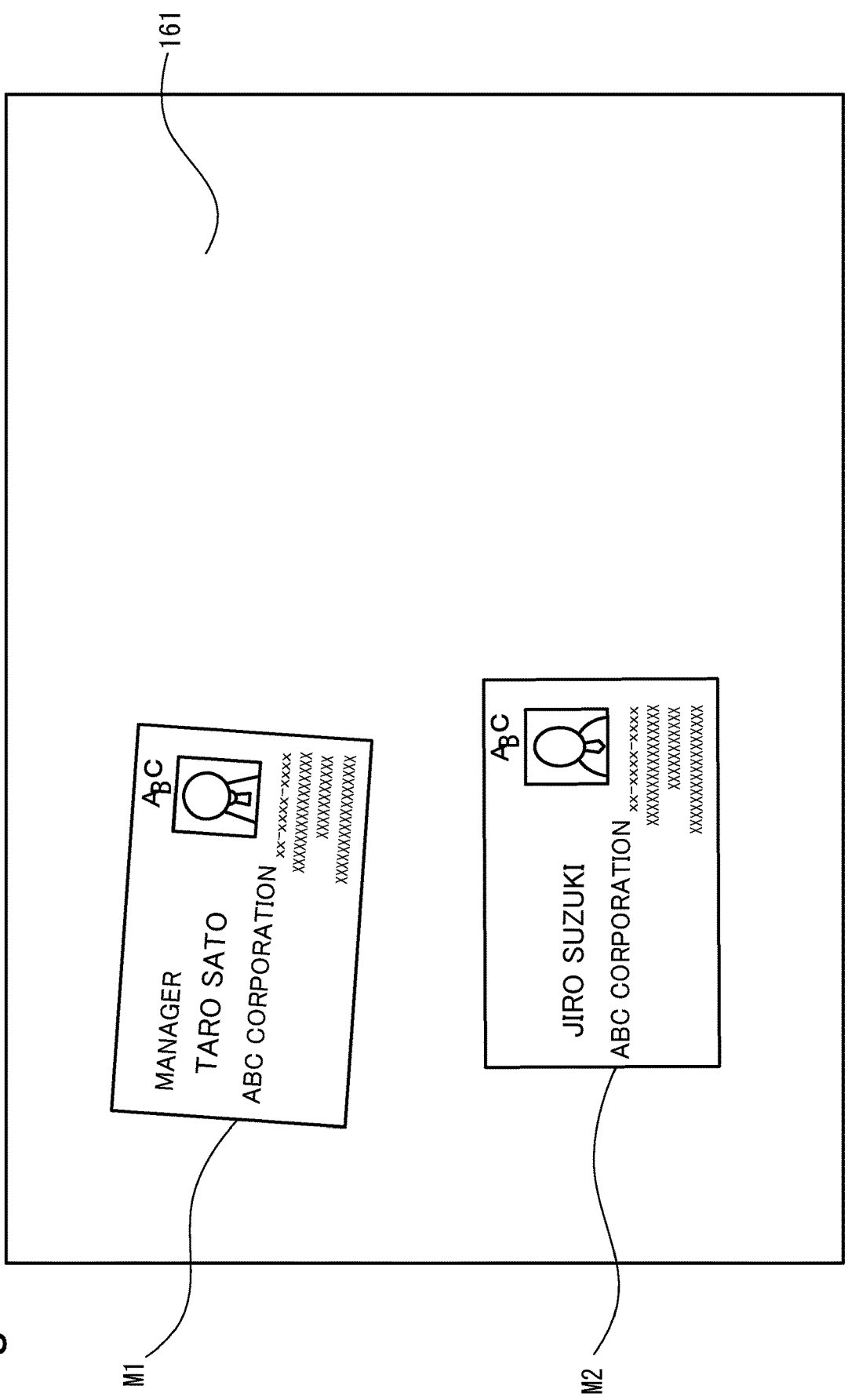
FIG. 11 is a diagram illustrating one example of a state in which documents are loaded on contact glass, viewed from a bottom.

FIG. 11 illustrates one example of a state in which a plurality of documents is loaded on the contact glass 161, viewed from a bottom. Some characters in FIG. 11 should have been same in the respective parts in FIG. 4. For the same reason noted above, the letter "X" is used in FIG. 11 to replace the characters. When a plurality of documents M1 and M2 is loaded on the contact glass 161 as illustrated in FIG. 11, rectangular images corresponding to one surface of the documents M1 and M2 are cut out as individual images G1 and G2 (FIG. 4) by the individual image cutting section 103.

Subsequently, the control section 100 judges whether or not an instruction for rereading the documents loaded on the contact glass 161, which instruction has been provided from the user through the operation unit 47, has been received by the operation reception section 101 (step S23). Note that the user flips over each of the documents to be loaded on the contact glass 161 before inputting the rereading instruction into the operation unit 47.

Upon judging that the instruction has been received by the operation reception section 101 (YES in step S23), the control section 100 causes the document reading unit 5 to read the documents loaded on the contact glass 161 and causes the image memory to store the image data obtained through the reading by the document reading unit 5 (step S24). The instruction is provided after the flip-over of the documents M1 and M2 by the user, and thus the document reading unit 5 is caused to read the flipped-over documents M1 and M2, that is, another surface of the documents M1 and M2.

Then the individual image cutting section 103 performs the processing of cutting out the individual images, which are independent for the respective documents, from the image data obtained through the reading by the document reading unit 5 (step S25).

Figure 12:
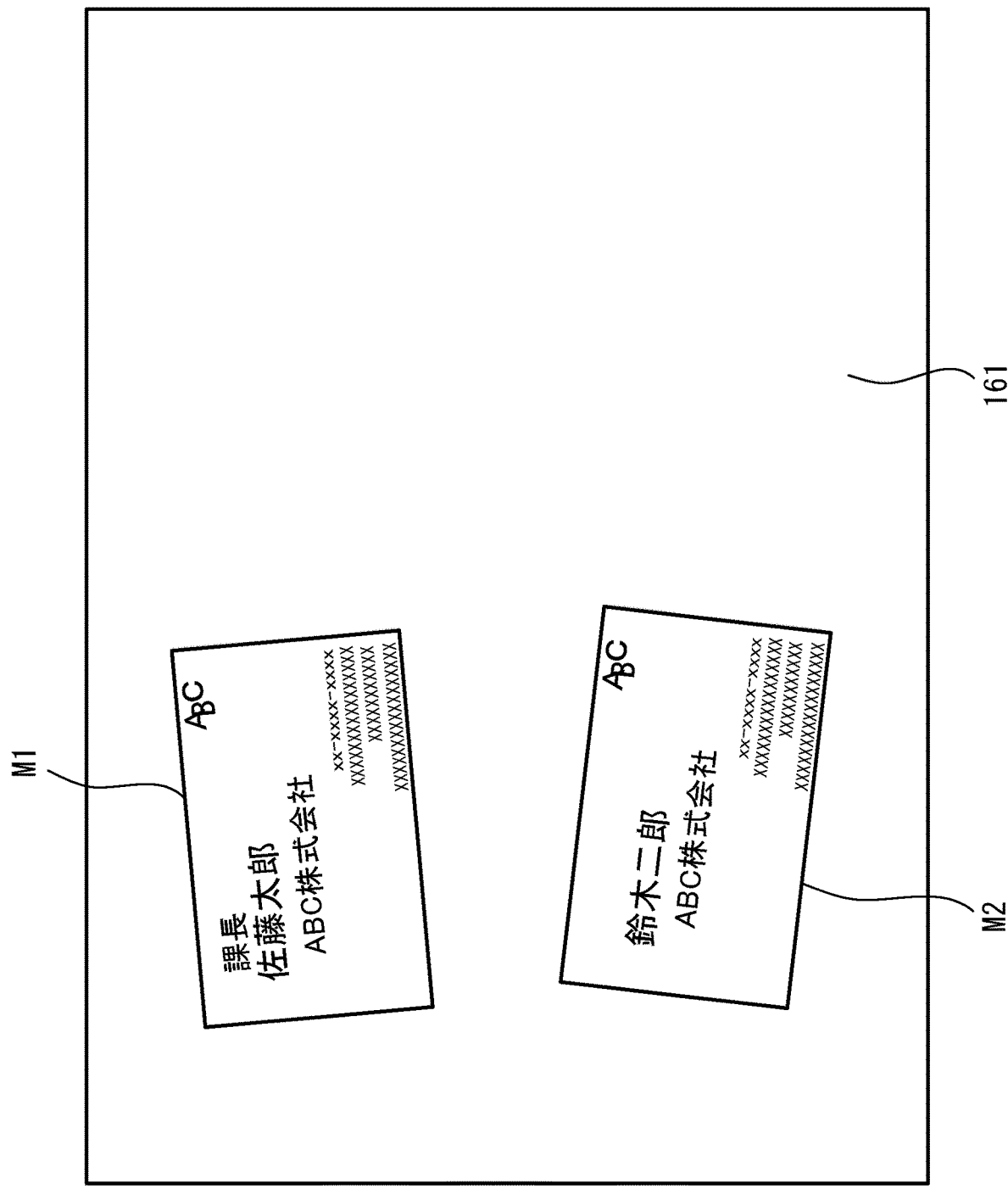
FIG. 12 is a diagram illustrating one example of a state in which the documents are loaded on the contact glass, viewed from a bottom.

FIG. 12 illustrates one example of a state in which the plurality of documents is loaded on the contact glass 161, viewed from a bottom. Some characters in FIG. 12 should have been same in the respective parts in FIG. 13. For the same reason noted above, the letter "X" is used in FIG. 12 to replace the characters. When the plurality of documents M1 and M2 flipped over is loaded on the contact glass 161 as illustrated in FIG. 12, rectangular images corresponding to another surface of the documents M1 and M2 are cut out as individual images G11 and G12 (see FIG. 13) by the individual image cutting section 103.

Then a character string detection section 104 performs processing of character recognition by use of, for example, an OCR technology on the image data of the individual images cut out by the individual image cutting section 103 in steps S22 and S25 to detect character strings present on the individual images (step S26). Processing in step S4 beyond is the same as the processing performed in the first embodiment and is thus omitted from the description.

The correction according to this disclosure requires at least three individual images serving as samples, and thus if only two documents can be loaded on the contact glass 161, the ratio of the aforementioned majority character does not reach over the half of the total ratio being referred to as the predefined ratio TH1 and the correction section 107 cannot perform the correction by replacing the minority character with the majority character in the first embodiment. In contrast, in the second embodiment, not only one surface but also another surface of the documents can be used and thus even if only two documents can be loaded on the contact glass 161, the four, that is, three or more individual images serving as samples can be provided, making it possible to perform the correction of replacing the minority character with the majority character. In particular, not a smaller number of name cards having the same information on both surfaces on the front surface of which the information is written in one's mother language (such as English) and on the rear surface of which the information is written in a foreign language (such as Japanese). Thus, for example, for a phone number, a mail address, etc., the character recognition error can be corrected by use of the image data obtained through the reading of the both surfaces by the document reading unit 5 through the plurality of reading jobs.

This disclosure is not limited to the configuration of the embodiments described above and various modifications thereto can be made. Moreover, the aforementioned embodiments have been described, referring to the multifunction peripheral as one embodiment of the image reader according to this disclosure, but this is only one example, and for example, any other image reader with a scanner function, etc. may be used.

Moreover, the configuration and the processing illustrated by the aforementioned embodiments with reference to FIGS. 1 through 13 form just one embodiment of this disclosure and thus it is not intended to limit this disclosure to the aforementioned configuration and processing in any manner.

While the present disclosure has been described in detail with reference to the embodiments thereof, it would be apparent to those skilled in the art the various changes and modifications may be made therein within the scope defined by the appended claims.

What is claimed is:

1. An image reader comprising:
   a document reading unit being capable of, through one reading job, collectively reading a plurality of documents loaded on a document loading surface; and
   a control unit including a processor and functioning as, when the processor executes a control program,
   an individual image cutting section performing processing of cutting out, from image data obtained through the reading by the document reading unit, individual images independent for the respective documents,
   a character string detection section performing character recognition processing on the image data of the individual images cut out by the individual image cutting section to detect character strings present on the individual images,
   a mismatch detection section detecting, from the character strings detected by the character string detection section, a mismatching portion by making comparison between the individual images with considering character strings having contents identical or similar to each other as same information,
   a judgment section judging for the mismatching portion whether or not a ratio of majority characters included in the same information reaches a predefined ratio, and
   a correction section, upon judging by the judgment section that the ratio of the majority characters has reached the predefined ratio, performing character correction by replacing a minority character with the majority character within the same information.

2. The image reader according to claim 1, wherein
   the mismatch detection section detects, from the character strings detected by the character string detection section, the mismatching portion by making comparison between the individual images with considering character strings which are located at identical or close positions on the individual images and also have contents identical or similar to each other as the same information.

3. The image reader according to claim 1, wherein
   the mismatch detection section detects, from the character strings present on the individual images cut out by the individual image cutting section from the image data obtained through the reading by the document reading unit in one or a plurality of reading jobs, the mismatching portion by making comparison between the individual images.

4. The image reader according to claim 1, wherein
   the mismatch detection section creates, for the character strings detected by the character string detection section, a character string list where the character strings with the same information are provided as one group, and detects the mismatching portion on an individual group basis by comparing between the character strings belonging to the respective groups basis with reference to the character string list.

5. The image reader according to claim 1, wherein
   the control unit further functions as a correction reception section, upon judging by the judgment section that the ratio of the majority characters has not reached the predefined ratio, receiving user correction on the majority and minority characters, and
   the correction section corrects the majority and minority characters in accordance with the user correction received by the correction reception section.

6. The image reader according to claim 5, further comprising
   a display, wherein
   upon judging by the judgment section that the ratio of the majority characters has not reached the predefined ratio, the correction reception section causes the display to display the character strings detected by the character string detection section, the character strings including the majority or minority characters.

7. The image reader according to claim 4, further comprising
   a storage unit, wherein
   the control unit further functions as a control section causing the storage unit to store the character string list subjected to the correction by the correction section.

* * * * *